T. H. PARKER.
FILTER.
APPLICATION FILED APR. 8, 1916.
1,212,996.
Patented Jan. 16, 1917.
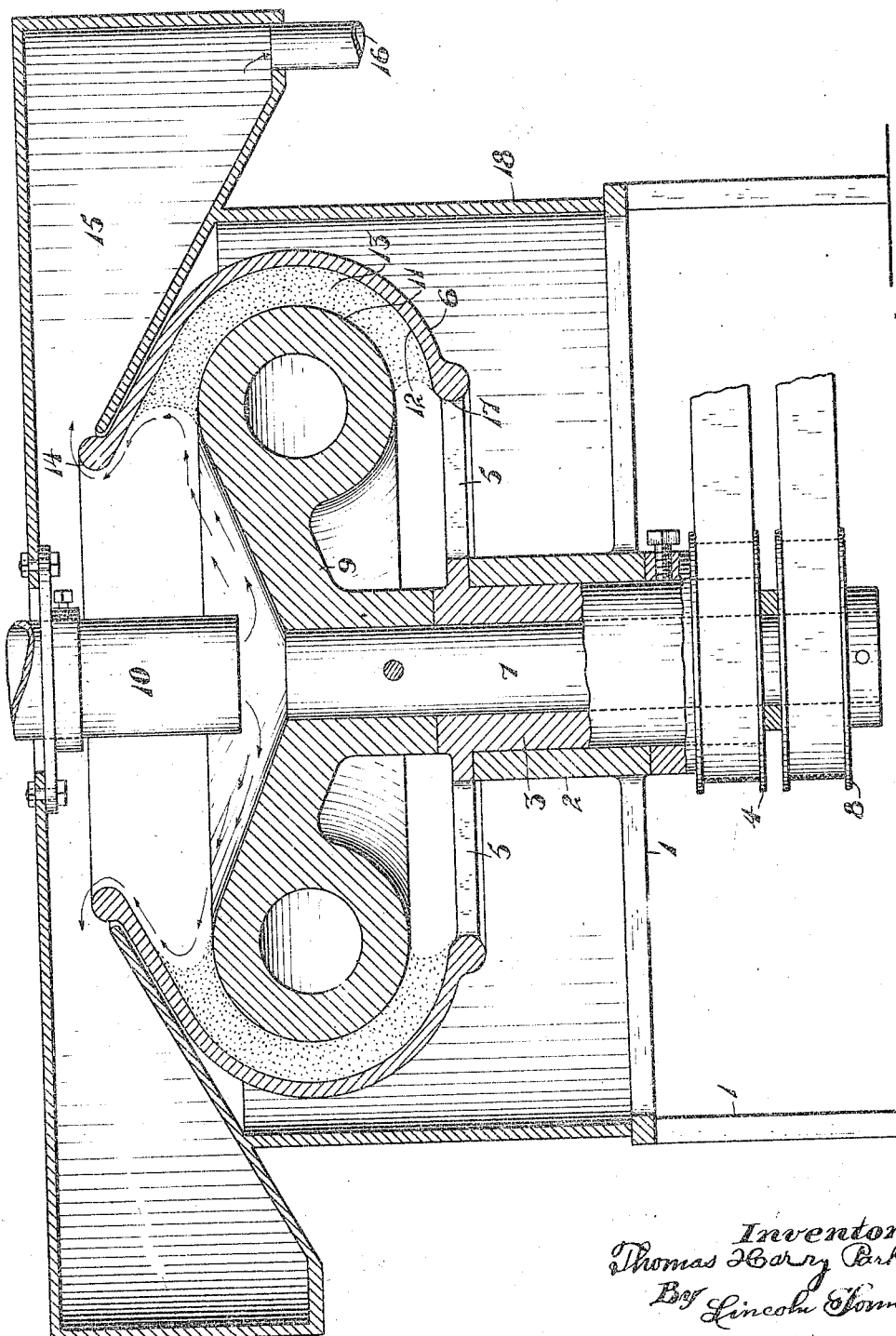
Inventor,
Thomas Harry Parker,
By Lincoln Sonntag,
Attorney

UNITED STATES PATENT OFFICE.

THOMAS HARRY PARKER, OF SAN FRANCISCO, CALIFORNIA.

FILTER.

1,212,996.   Specification of Letters Patent.   Patented Jan. 16, 1917.

Application filed April 8, 1916.   Serial No. 89,808.

*To all whom it may concern:*

Be it known that I, THOMAS HARRY PARKER, a citizen of the United States, residing at the city of San Francisco, in the county of San Francisco and State of California, have invented certain new and useful Improvements in Filters, of which the following is a specification.

My invention relates to improvements in filtering apparatus.

The object of my invention is to provide a continuous filtering apparatus for the purpose of mining, or filtering for domestic use, or separating oxygen and hydrogen gases, or any mixture which is made up of particles of different density.

Referring to the accompanying drawing the figure is a central vertical section of my apparatus.

In the drawing 1 indicates a base or support for a bearing 2, in which can rotate a sleeve 3 carrying at its lower end a pulley 4, and said sleeve carries at its upper end by means of webs 5 a cylindrical housing 6 rotatable with said sleeve 3. Within said sleeve 3 is a shaft 7, rotatable within said sleeve, and which shaft carries at its lower end a pulley 8 and at its upper end a centrifugal distributer 9. The solution carrying fine particles of sand or sediment of any kind is fed from a pipe 10 to the center of said distributer 9, and as said distributer rotates it carries the sediment to its outer curved periphery 11, where the same will be held between such periphery and the surrounding curved wall 12 of the housing 6.

When the space between walls 6 and 11 is filled up with sediment as shown at 13 the water or valuable light particles will flow over the upper edge 14 of the housing 6 and into an upper cylindrical receptacle 15 supported on the base 1 and having a discharge pipe 16. The sediment will be forced out beneath the lower edge 17 of the housing 6 and be discharged against a lower cylindrical receptacle 18, from which it may be carried off by any suitable means. The said housing 6 and the distributer 9 are arranged so as to be rotatable at different speeds by any suitable means so as to prevent the sediment from packing between them. The fine particles of sediment cannot work back with the centripetal force, but the clear solution only is able to pass over the rim 14. When the sediment in the upper part of the semicircular passage becomes larger in volume than the sediment in the lower half thereof, there tends to be a movement of the entire mass in a downward direction, and this movement forces some of the sediment out of the lower end of said passage and thence into the lower chamber 18. The said movement continues at intervals while the apparatus is in operation. The discharge pipe 10 is supported centrally in the receptacle 15 as shown. The part of the apparatus shown centrally divided in the drawing corresponds to the other part thereof not shown, said apparatus being preferably circular in form. The upper portion of the distributer is provided with a central depression as shown in the drawing. Belts for the operation of the pulleys are shown thereon.

I claim:—

1. In a filter a core, having a central depression, a shaft carrying said core and rotatable therewith, a shell projecting over and surrounding said core and provided with an upper opening having an edge and a lower opening, a rotatable sleeve penetrated therethrough by said shaft and upwardly carrying said shell, a receptacle provided with a lower opening surmounting said core and shell, and having a base inclining downwardly from and below the said edge of said shell, and a casing surrounding said shell and sleeve.

2. In a filter a core having a central inclined depression, a shaft carrying said core and rotatable therewith, a shell projecting over and surrounding said core, and provided with an upper opening having an edge and a lower opening, a rotatable sleeve penetrated therethrough by said shaft and upwardly carrying said shell, a receptacle provided with a lower opening surmounting said core and shell, and having a base inclining downwardly from and in alinement with said edge of said shell; a casing surrounding said shell and sleeve, and a pipe extending downwardly through said receptacle and in proximity to the center of said inclined depression.

In testimony whereof I affix my signature in presence of two witnesses.

THOMAS HARRY PARKER.

Witnesses:
R. B. TREAT,
W C. DUNLAP.